July 11, 1950   H. E. SIMI   2,514,421
HYDRAULIC BRAKE SYSTEM
Filed Oct. 30, 1944   2 Sheets-Sheet 1

Inventor
Hendrick E. Simi,
Strauch & Hoffman
Attorneys

July 11, 1950 H. E. SIMI 2,514,421
HYDRAULIC BRAKE SYSTEM
Filed Oct. 30, 1944 2 Sheets-Sheet 2
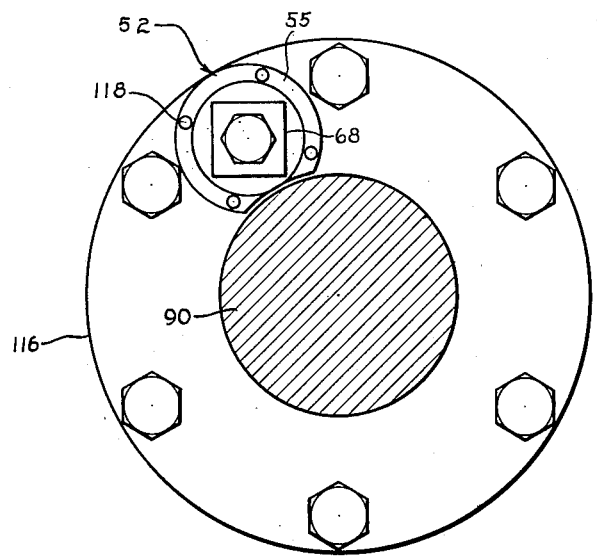
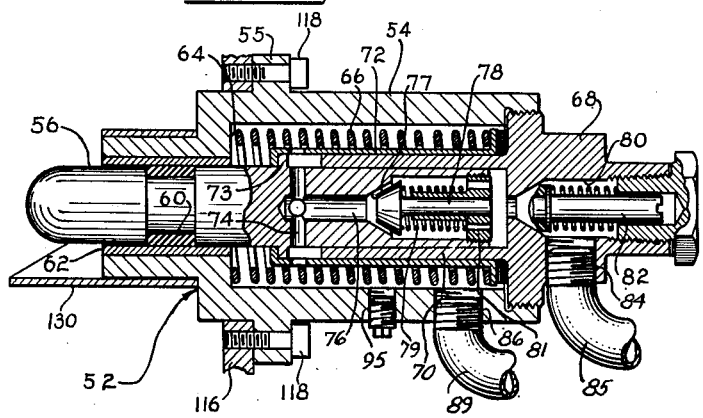
Inventor
Hendrick E. Simi,
By Strauch & Hoffman
Attorneys Patented July 11, 1950

2,514,421

UNITED STATES PATENT OFFICE 2,514,421

HYDRAULIC BRAKE SYSTEM

Hendrick E. Simi, Ferndale, Mich., assignor to The Timken-Detroit Axle Company, Detroit, Mich., a corporation of Ohio Application October 30, 1944, Serial No. 561,122

6 Claims. (Cl. 188—152)

This invention relates to improvements in vehicle brake hydraulic systems and has particular reference to improvements in brake hydraulic systems that include a booster pump actuated by some moving part of the vehicle and brought into effective operation upon normal manual manipulation of the vehicle brake controls.

Such a pump acts as a pressure booster for the brake operating fluid and increases the pressure acting on the wheel cylinders without requiring any additional pedal pressure. The pump pressure is, however, at all times under the control of the brake pedal so that the pressure acting on the brake wheel cylinders is under the control of the vehicle operator.

Such booster pumps have heretofore been mainly operated by engine driven parts of the vehicle, such as the vehicle drive shaft. This arrangement is satisfactory where a suitable power take-off connection is available, but it has been found difficult to utilize a booster pump system of this type in a towed vehicle such as a trailer or a car or coach pulled by a tractor or locomotive, or in any part of a vehicle not havin a conveniently located power shaft or the like.

In the case of detachable tractor trailer units particularly, it has been found advantageous to supply the trailer with its own independent brake system to prevent loss of fluid and brake adjustment during coupling and uncoupling operations and also because the trailer brakes must be applied before and somewhat stronger than the tractor brakes to prevent the trailer from "running up" on the tractor and "jack-knifing" the vehicle, that is, causing the vehicle to buckle upwardly at the connection between the tractor and the trailer.

The trailer brakes, in such an arrangement, may be operated by the tractor brake pedal through a suitable relay, or may be operated by a separate lever disposed conveniently to the operator of the vehicle.

In attempting to apply the booster pump to a trailer brake system it is found that there is no engine driven power shaft or other convenient rotating power take-off part from which the pump may be positively operated, and the provision of a pump drive shaft drive coupled to the engine would necessitate a complicated and expensive coupling arrangement.

It is conceived, according to a preferred embodiment of the invention, that these problems may be conveniently and economically solved and a satisfactory and dependable trailer brake booster system provided by actuating the booster pump directly from a part of the trailer which is normally idle but is moved when the trailer is in motion, such as one of the trailer wheels.

The invention will hereinafter be described in its preferred embodiment wherein a booster pump is driven from one of the trailer wheels, but it will be understood that this will be illustrative only of the invention which in its broader aspects relates to actuation of the pump from any normally idle vehicle part that is moved in response to movement of the vehicle.

It is therefore the major object of this invention to provide an arrangement wherein a booster pump for a brake hydraulic system is operated directly by a normally idle part actuated by movement of the vehicle, such as a trailer wheel supporting a non-drive axle.

A further object resides in an improved brake hydraulic system of the character indicated wherein a vehicle wheel and wheel mounting structure is constructed and arranged to provide a simple and efficient support and actuating mechanism for a brake fluid pressure booster pump.

A still further object resides in the provision of an improved brake hydraulic system of the character indicated wherein a booster pump actuated by one wheel of a vehicle serves to control the fluid pressure applied to all of the wheel brake cylinders.

Other objects and advantages will become apparent from the following description in connection with the accompanying drawings and from the appended claims.

In the accompanying drawings, in which like reference numerals are used to designated similar parts throughout, there is illustrated a suitable mechanical embodiment for the purpose of disclosing the invention. The drawings however are for the purpose of illustration only and are not to be taken in a limiting or restrictive sense since it will be apparent to those skilled in the art that various changes in the illustrated embodiment may be resorted to without in any way exceeding the scope of the invention.

In the drawings:

Figure 2 is a transverse sectional view of the vehicle axle showing the location of the pump relative to the axle; and Figure 3 is a longitudinal sectional view of a suitable pressure booster pump construction which may be used in the invention.

Figure 1:
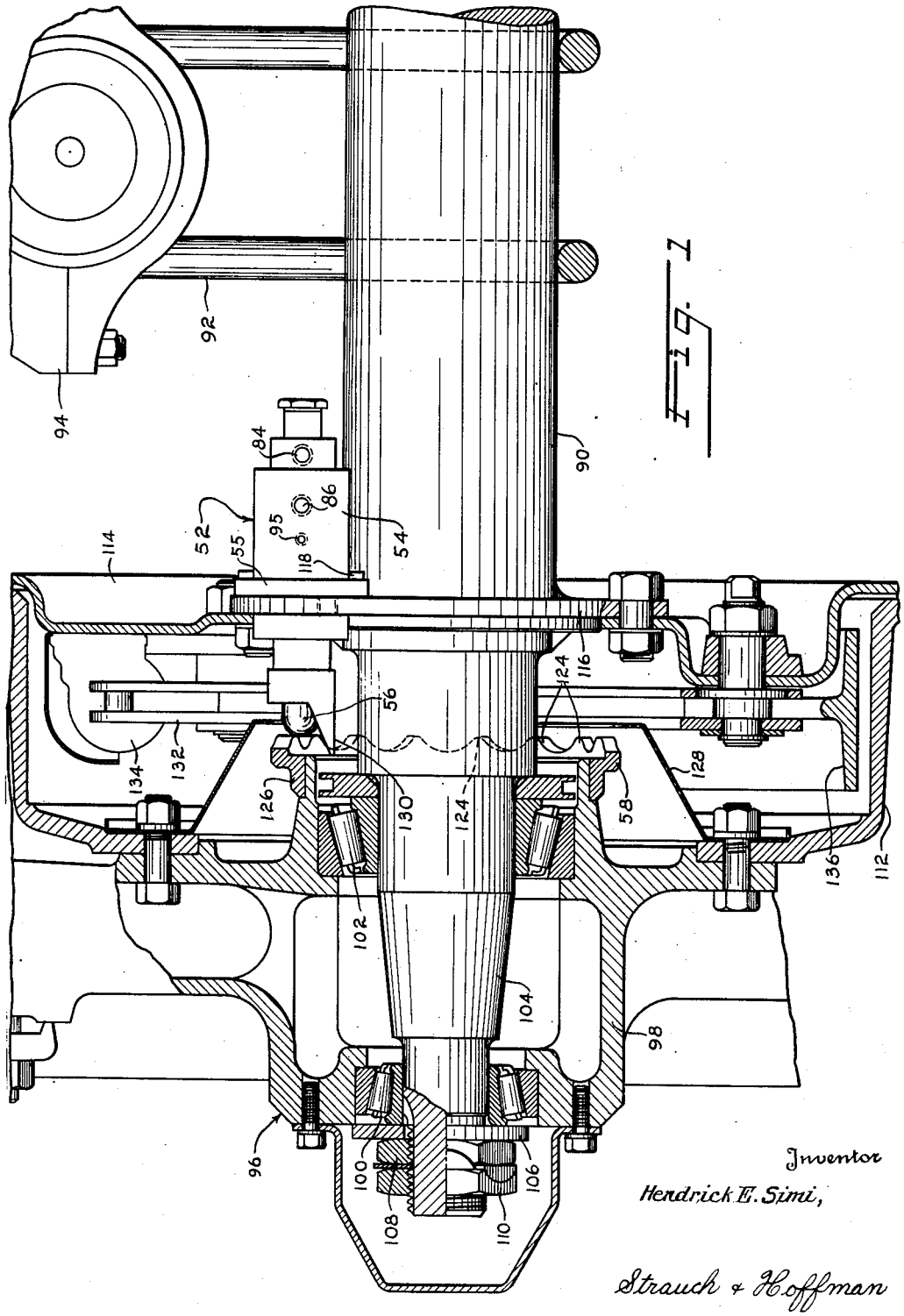
Figure 1 is a sectional view of a vehicle, trailer or like, non-driven wheel and wheel mount showing the application of a hydraulic booster pump thereto according to a preferred embodiment of the invention.

A hydraulic fluid pressure booster pump, generally indicated at 52, is operatively connected as by conduit 89 to a master cylinder source of hydraulic pressure in a manner which will permit fluid to flow through the pump into conduit 85 which is suitably connected to all of the wheel brake cylinders until a predetermined pressure is reached, whereupon the pump is brought into operation to increase the pressure in conduit 85.

The pump is shown in Figure 3 and comprises a cylindrical body 54 having an internal bore within which a plunger 56 is reciprocable when actuated by a suitable vehicle part such as the wheel driven cam 58 of Figure 1. This plunger has an end portion projecting out of the cylinder for contact with the cam and adjacent to the projecting end there is a packing seal 60 slidable in a bushing 62 secured in the end of the cylinder bore. At the inner end of the bushing 62 the cylinder bore is enlarged, as indicated at 64, to receive a compression spring 66. A chamber head 68 is screw threaded into an internally threaded counterbore in the outer end of the cylinder and is provided with an integral sleeve portion 70 which closely surrounds the plunger 56. A cylindrical spring retainer 72 surrounds sleeve portion 70 and has one end upset inwardly and in engagement with an annular shoulder 73 on the plunger, and the opposite end upset outwardly and overlying the outer end of the spring 66, so that when the plunger 56 is moved outwardly or away from chamber head 68, spring 66 will be compressed. Plunger 56 is provided intermediate its length with passages 74 leading to a central well or bore 76 which includes valve seat 77 for spring biased poppet valve 78 which limits the direction of flow of fluid through the bore 76 to the direction from the passages 74 to the outer end of the bore. Valve 78 is urged into seating relation with seat 77 by compression spring 79 which has for its abutment apertured sleeve 81 screw threaded into the open end of bore 76, said apertures providing fluid passages.

Chamber head 68 is provided with a well or bore 80 communicating with the end portion of the interior of the inner cylinder 70 and including a spring biased poppet valve 82 disposed between the end of the inner cylinder and an outlet port 84 which connects through conduit 85, Figure 3, with the wheel brake cylinders.

Passages 74 connect through the open end of sleeve 70 and suitable registering apertures in spring retainer 72 with the space containing spring 66, which space is connected through port 86 with fluid conduit 89 from the brake master cylinder. An air bleed port 95 normally closed by a plug is provided for bleeding air from the pump when the system is filled.

With this construction, fluid from the master cylinder may enter through port 86 into the space containing the spring 66 and from this space may pass through the passages 74, the central bore 76, the check valve 78, the check valve 82 and bore 80, and through the opening 84 to the wheel brake cylinder conduit. The spring 66 will maintain plunger 56 out of contact with cam 58 during the initial stage of brake application and until the fluid pressure in the space at the closed end of sleeve 70 is sufficient to overcome the force of spring 66 and move the plunger into contact with the cam. When the plunger contacts the cam, the piston will begin to reciprocate in the sleeve 70 and will pump fluid from the opening 86 to the opening 84 thereby increasing the fluid pressure applied to the associated brake wheel cylinders.

Figures 1 and 2 show a preferred arrangement for operatively mounting the booster pump 52 for operation by a wheel of a trailer vehicle.

The trailer axle 90 is shown as mounted in a suitable hanger 92 secured to a supporting bracket 94. The axle is held against rotation and transfers the vehicle load to the road wheels, one of which is generally indicated at 96. The wheel 96 has a hollow hub portion 98 journalled by suitable bearings, such as the spaced roller bearings 100 and 102, on the wheel bearing end portion or spindle portion 104 of the axle 90, the hub being maintained in operative position on the spindle by suitable means, such as the thrust washer 106 and nuts 108 and 110 screw threaded onto the reduced end of the axle. The hub 98 carries an annular brake drum 112 the open end of which is covered by a suitable dust shield or backing plate 114 centrally apertured to receive the end portion of the axle and secured around the aperture to a brake support flange 116 welded or otherwise rigidly secured to the axle 90 and extending radially therefrom.

An aperture is provided in the flange 116 and the outer end of the plunger 56 of pump 52 is extended therethrough. Pump body 54 is provided with a flange 55 surrounding the cylinder bore and this flange is apertured to receive suitable bolts or screws, as indicated at 118, which extend into suitable screw threaded apertures in the flange 116 and have heads bearing against the outer side of flange 55 to secure the pump firmly in place on the brake supporting flange 116. In the form illustrated four bolts are used to secure the cylinder to the brake flange.

In securing cam 58 to the hub, a reduction is preferably first provided on the outer surface of the hub end, the diameter of which is slightly greater than the internal diameter of the cam band 126 where both the hub and the cam are at the same temperature. The annular cam may be heated to an extent sufficient to increase its internal diameter so that it will slide over the reduced hub portion after which the temperatures may be permitted to normalize thereby shrinking the cam tightly and non-rotatably upon the end portion of the hub.

In the form illustrated the cam is provided with a plurality of lobes, as indicated at 124, contoured to interfit with the end of plunger 56 and obtain prompt and effective operation of the booster pump 52 when the brakes are applied.

The hub member is provided with an inwardly extending tapered or flared oil baffle 128 which surrounds the annular cam 124 and projects somewhat inwardly thereof. The end of the housing 52 carries an oil deflector 130 having at the lower side thereof a lip which extends into the baffle 128 so that any oil or brake fluid leaking past the plunger will be deflected into the baffle 128 and will not get into the brake mechanism or on the brake lining.

The brake mechanism may be of any suitable form, such, for example, as that shown in United States Letters Patent No. 2,337,070, in which case it would include shoes, as indicated at 136, and shoe actuating levers, as indicated at 132, and one of the wheel brake cylinders operatively associated with the levers. The pump plunger 56 extends through the mechanism of the corresponding brake between the levers and does not interfere in any way with the brake mechanism.

Operation

Plunger 56 is normally out of contact with cam 58 since plunger 56 is urged to retracted position by compression spring 66.

When the operator applies the brakes, fluid from the master cylinder is forced through into the pump inlet connection 86 from which it flows past valves 76 and 82 to pump outlet connection 84 and thence through conduit 85 to the wheel brake cylinders. The initial flow of hydraulic fluid takes up the slack in the brake mechanisms and brings the brake shoes firmly into contact with the corresponding brake drums. Continued application of the master cylinder pressure becomes effective within the chamber between chamber head 68 and the adjacent end of plunger 56 to displace the plunger outward against the force of spring 66 and into contact with cam 58 which rotates with wheel 96 when the vehicle is in motion. As cam 58 forces plunger 56 back, valve 78 will close and the plunger will force the fluid in the chamber out past valve 82 which will close against return flow of the fluid. Pump operation is controlled by master cylinder pressure and will discontinue when that is interrupted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a vehicle axle having a brake support flange thereon and a wheel hub journalled on said axle at one side of said flange; a hydraulic booster pump projecting through an aperture in said flange; and a cam on said hub for operating said pump.

2. The combination defined in claim 1 wherein said pump has a plunger extending through said aperture and a cylinder secured to said brake support flange around said aperture.

3. The combination defined in claim 1 wherein said pump is a reciprocating type pump and said cam is an annular face cam having lobes extending parallel to the axis of rotation of said hub.

4. The combination as defined in claim 1 wherein said brake support flange carries friction brake mechanism and said pump extends through said brake mechanism.

5. In a vehicle brake assembly, an axle, a ground engaging wheel journaled on said axle, an annular cam rigid with said wheel and having a plurality of inwardly facing peripheral lobes, a booster pump mounted on a stationary support adjacent said wheel, and a piston rod reciprocable parallel to the axis of said wheel projecting from said pump and normally disposed out of contact with said cam but adapted to be advanced into contact with said cam lobes for actuation thereby under control of the vehicle operator.

6. In combination with a vehicle axle, a wheel hub journalled thereon having a brake drum, hydraulically operated friction brake mechanism mounted on the axle within said drum, a support for said brake mechanism and a hydraulic booster pump having a reciprocable plunger in substantially axially parallel relation with the axle mounted on said support, and means carried by said wheel hub and operable in the rotation thereof to actuate said pump plunger.

HENDRICK E. SIMI.

REFERENCES CITED

The following references are of record in the file of this patent:

UNITED STATES PATENTS

| Number | Name | Date |
|---|---|---|
| 1,529,097 | Tucker | Mar. 10, 1925 |
| 1,610,755 | Decker | Dec. 14, 1926 |
| 1,749,495 | Macpherson | Mar. 4, 1930 |
| 2,107,257 | Beusch | Feb. 1, 1938 |
| 2,396,879 | Stelzer | Mar. 19, 1946 |

FOREIGN PATENTS

| Number | Country | Date |
|---|---|---|
| 311,255 | Great Britain | May 7, 1929 |
| 364,659 | Great Britain | Jan. 11, 1932 |